United States Patent [19]

Kawarada et al.

[11] 4,331,398
[45] May 25, 1982

[54] DEVICE FOR TRANSPORTING SLIDE FILM MOUNTS IN A SLIDE FILM PROJECTOR

[75] Inventors: Tsutomu Kawarada, Ageo; Kimichika Yamada, Kawaguchi; Hiroshi Sangō, Satte; Katsushige Kiyokawa, Omiya, all of Japan

[73] Assignee: Copal Company Limited, Tokyo, Japan

[21] Appl. No.: 127,779

[22] Filed: Mar. 6, 1980

[30] Foreign Application Priority Data

| Mar. 3, 1979 | [JP] | Japan | 54/26506 |
| Apr. 9, 1979 | [JP] | Japan | 54/42830 |
| Apr. 9, 1979 | [JP] | Japan | 54/42831 |
| Apr. 9, 1979 | [JP] | Japan | 54/42833 |
| Apr. 9, 1979 | [JP] | Japan | 54/46692[U] |
| Apr. 9, 1979 | [JP] | Japan | 54/46693[U] |
| May 4, 1979 | [JP] | Japan | 54/59904 |

[51] Int. Cl.$^3$ ............................................. G03B 23/00
[52] U.S. Cl. ............................................. 353/113
[58] Field of Search .............. 353/103, 112, 113, 118, 353/23, 116

[56] References Cited

U.S. PATENT DOCUMENTS

| 1,489,632 | 4/1924 | Enell | 353/113 |
| 2,412,246 | 12/1946 | Blumenstein | 353/112 |
| 3,412,495 | 11/1968 | Zillmer | 353/103 |
| 3,457,009 | 7/1969 | Landesman | 353/23 |

FOREIGN PATENT DOCUMENTS 959231 2/1957 Fed. Rep. of Germany ...... 353/113

Primary Examiner—John W. Shepperd
Attorney, Agent, or Firm—McAulay, Fields, Fisher, Goldstein & Nissen

[57] ABSTRACT

A device for transporting a plurality of slide film mounts in either direction between a pair of magazines in a slide film projector comprises a pair of endless mount-driving belts, each of which has a stretch adapted to run across the open end of each magazine in close contact therewith and at least a pair of spaced mount-catching stepped shoulder portions formed in the belt surface facing the open ends of the magazines. In operation from a starting position, each belt is driven by actuating a starting button so that a mount, if engaged by a shoulder portion, is received in one of the magazines by the movement of that shoulder portion of the belt, and, thereafter, one of the mounts housed in the other magazine is caught by that shoulder portion of the belt and moved out of that other magazine toward the film projection gate, stopped, and held thereat for projection so as to complete a cycle. Continuous operation may be effected manually or automatically by a control circuit. In each cycle, the belt may be moved as above or, alternatively, it may be moved in one and the same direction during one cycle until the same shoulder portion, after urging one mount into a magazine, moves further to catch the next mount in the other magazine and moves it to the film projection gate. The direction of the respective movement of the belt in each cycle can be reversed to transport mounts from one magazine to the other.

21 Claims, 18 Drawing Figures

DEVICE FOR TRANSPORTING SLIDE FILM MOUNTS IN A SLIDE FILM PROJECTOR

BACKGROUND OF THE INVENTION

The present invention relates to a device for transporting slide film mounts in a slide film projector, and, more particularly, to a device for transporting slide film mounts in a slide film projector which permits the mount to be transported successively by means of driving belts from one of a pair of magazines in the projector to the other magazine after they have been subjected to image projection thereof and vice versa.

A slide film projector was well known in which the slide film mounts housed in a magazine are automatically brought out of the magazine successively and, after the projection thereof has been completed, they are automatically and successively received in the same magazine or another magazine. In this case, the transport of the mounts from the supply magazine to the projection gate, and the transport of the mounts into the receiving magazine are carried out by a level mechanism actuated by electromagnetic plunger means or a lever mechanism utilizing electric motor driven cam means.

In such a projector, substantial noise will be generated by the actuation of the lever mechanism, thereby deteriorating performance if it is used in combination with audio means or sound means, while the mounts might be injured by claw means utilized in feeding the mounts.

In a magazine, since each mount is usually located in the respective housing recess in the magazine, time consuming and troublesome manual operation is required in using the magazine, while the size of the magazine is rendered to be large because of the necessity of providing partitions between the respective housing recesses.

The present invention aims at avoiding the above described disadvantages of the prior art slide film projector.

Further, in the heretofore proposed magazine, only the slide film mounts of a predetermined thickness can be housed in the magazine. As is well known, however, the industrial standard on slide film mounts provides various thicknesses thereof in the range of 1.3 mm to 3.2 mm. Therefore, an operator might possess slide film mounts of various thicknesses, but they can not be housed in one and the same magazine thereby requiring a number of magazines each for the mounts of different thickness.

Further, a slide film mount might have projecting fins or deformed portions formed in the manufacture of the mount in the inner edge of the opening in the mount through which the image of the film is viewed or projected. Such fins or deformed portions might cause blocking of the feeding of one magazine or simultaneous feeding of two mounts when one mount is fed from one magazine or housed in the other magazine due to seizing or catching action of the fins and deformed portions of one mount to the adjacent mount relatively moved to that one mount. Such a failure might cause damages to the mount or the parts of the projector per se.

On the other hand, in a projector of the type described above, the final position of the belt at the end of each cycle of operation which should be accurately determined in order to locate the mount in alignment with the film projection gate. However, dimensional errors in manufacture and assembly of parts of backlashes between the parts engaging with each other necessarily occur thereby requiring fine adjustments of the parts in order to achieve the above described accurate alignment. Moreover, since the mounts can be transported from one magazine to the other magazine or vice versa, it is not enough to merely effect the above fine adjustments for one direction of movement of the belts, but it is necessary to further effect fine adjustments for the opposite direction of movement of the belts after the fine adjustments for the one direction of movement of the belts have been effected.

The present invention further aims at avoiding the above described difficulties in the prior art slide film projector.

SUMMARY OF THE INVENTION

It is a primary object of the present invention to provide a novel and useful device for transporting successively a number of slide film mounts from one magazine in a slide film projector of the type described above to another magazine after projection of the from in each mount or vice versa, which device can be made very compact and avoids the above described disadvantages of the prior art slide film projector, while the noise during the operation can be reduced to the minimum.

Another object is to provide a device of the type described above in which a plurality of mounts having various thickness can be housed randomly in the magazine without causing any failure in operation of the projector.

A further object is to provide a device of the type described above in which each mount can be smoothly fed out of one magazine and housed in the other magazine or vice versa even though projecting fins or deformed portions exist in the inner edge of the opening in each mount which might cause seizure or blocking between the relatively moved two mounts.

A still further object is to provide a device of the type described above in which the fine adjustments of the parts in the projector can be easily effected at a lower cost without requiring any complicated construction and manipulation.

Further objects and advantages of the present invention will be apparant from the following detailed description of the preferred embodiments of the present invention with reference to the accompanying drawings showing the same.

DETAILED DESCRIPTION OF THE PREFERRED EMBODIMENTS

Figure 1:
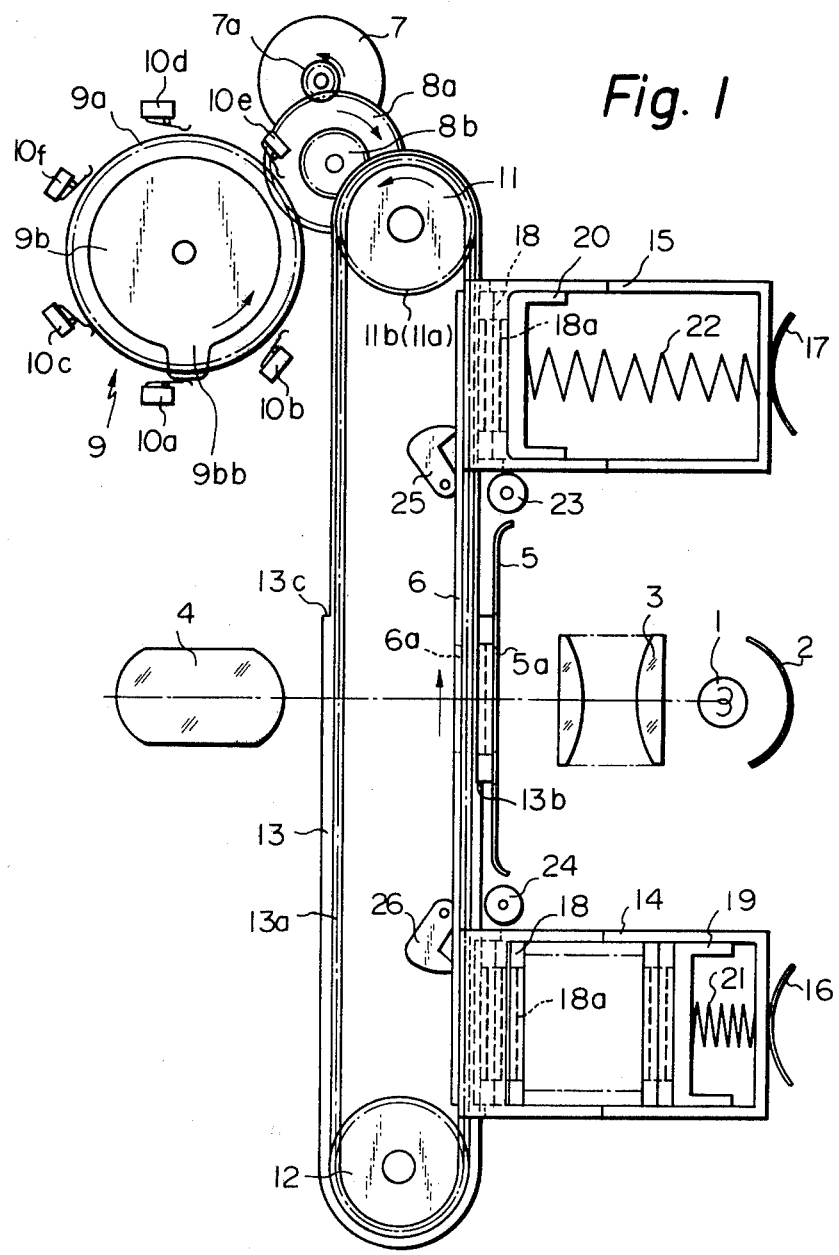
FIG. 1 is a plan view partly in cross-section showing a slide film projector incorporating one form of the device of the present invention.

With reference to FIG. 1, the projector shown comprises in the well known manner a lamp 1, a reflector 2, a condenser lens 3, a projecting lens 4, a pressure plate 5 having a film projecting aperture 5a, a film projecting gate 6 having a film projecting aperture 6a. In the projector an electric driving motor 7 is provided which drives a gear 11a through a driving gear train consisting of a pinion 7a secured to the shaft of the motor 7, a gear 8a meshing with the pinion 7a, a gear 8b integral with the gear 8a and meshing with the gear 11a.

The gear 11a is integral with a belt driving roller 11 having a pair of geared pulleys 11b for driving the pair of endless mount driving belts 13 each having gear teeth 13a in its inner surface which engage with the respective toothed pulley 11b. The belts 13 are guided by a pair of guide rollers 12, respectively, so that the belts 13 are moved by the motor 7 in the generally oval shape having two straight parallel stretches.

Figure 2:
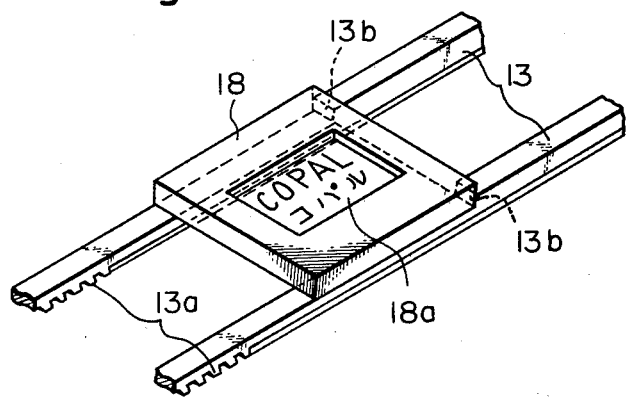
FIG. 2 is a fragmentary perspective view showing the pair of mount driving belts together with a slide film mount transported thereby.

Each of the belts 13 is formed with at least a pair of opposing stepped shoulder portions 13b, 13c having a height less than the minimum thickness of the mount 18, i.e., about 0.8 mm, for example, as shown in FIG. 1, at its outer surface made of a material having a very low coefficient of friction, the position of each shoulder portion 13b, 13c of one belt 13 being accurately aligned with the respective one of the other belt 13. The belts 13 are parallelly spaced from each other as shown in FIG. 2 so that a slide film mount 18 can be caught by the shoulder portion 13b or 13c of each belt 13 and driven by the belts 13 as the belts 13 are moved. The distance between the belts 13 is so determined that the image of the film 18a appearing in the opening of the mount 18 is not obstructed by the belts 13. The distance between the shoulder portions 13b and 13c is selected to be far greater than the width of the mount 18 for the sake of safe operation.

In order to control the operation of motor 7, and, hence, the movement of the belts 13, a position detecting block 9 is provided. The block 9 is freely rotatably supported and comprises a gear 9a meshing with the gear 8a so as to be rotated by the motor 7 and a detecting disc 9b integral with the gear 9a and having a projecting cam portion 9bb in its periphery. A plurality of detecting switches 10a-10f are arranged around the periphery of the disc 9b in appropriately spaced relationship from each other so as to be actuated sequentially by the projecting cam portion 9bb as the disc 9b rotates while the belts 13 are moving.

Figure 4:
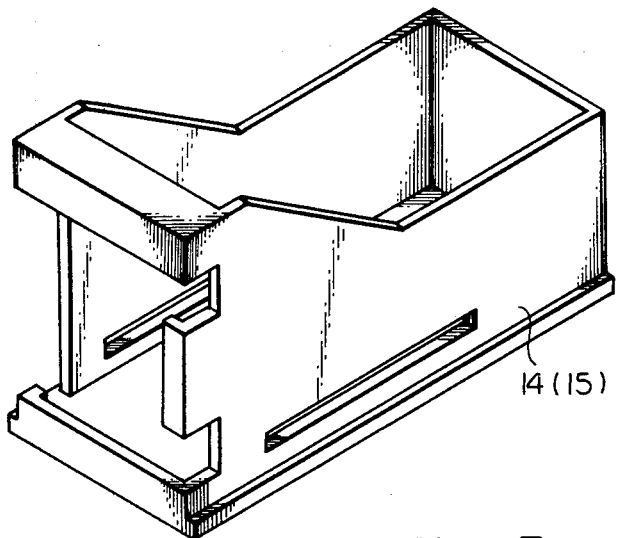
FIG. 4 is a perspective view showing a body of a magazine for housing mounts therein.
Figure 5:
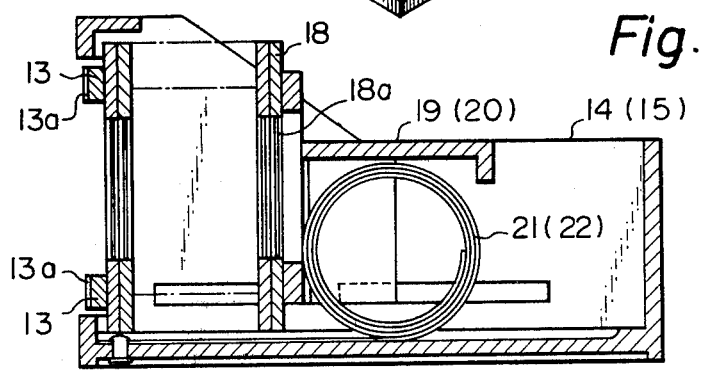
FIG. 5 is a cross-sectional view showing the internal construction of the magazine shown in FIG. 4.

As shown in FIGS. 4 and 5, the mount supply magazine 14 is of the same construction and size as the mount receiving magazine 15 and can be used reversely, and they are detachably mounted in position in the body of the projector so that the mount inlet/outlet opening of each magazine 14, 15 closely contacts with the gate 6 and urged thereagainst by means of compression springs 16, 17 respectively. The mounts 18 of various thicknesses may be randomly housed in the magazine 14 or 15 directly in superposed relationship to each other. Mount pressing plates 19, 20 are slidably arranged in the respective magazines 14, 15 and urged toward the openings thereof by compression springs 21, 22, respectively, so that the mounts 18 in the magazine are pushed toward the opening thereof thereby the frontmost mount 18 in the magazine is held closely contacting with the gate 6. Although the spring 21 (22) is shown only schematically in FIG. 1, the spring 21 (22) is preferably of a coiled spring with one end attached to the bottom of the magazine as shown in FIG. 5 so that the plate 19 (20) is urged in any position by the substantially constant shrinking force thereof.

As shown in FIG. 1, one of the straight stretches of each belt 13 is guided through inlet/exit recesses formed in the side walls of each magazine 14 (15) at the forward end thereof parallel to the gate 6. Thus, a frontmost mount in either one of the magazines can be fed by the engagement of the shoulder portion 13b or 13c in each belt 13 with the edge of the mount 18 as the belts 13 are moved in one or the other direction.

In order to prevent two or more mounts 18 from being fed out of the magazine simultaneously, a roller 23 (24) is provided adjacent to the exit of each magazine 15 (14) as shown in FIG. 1 and is urged toward the gate 6 by a spring (not shown).

Figure 3:
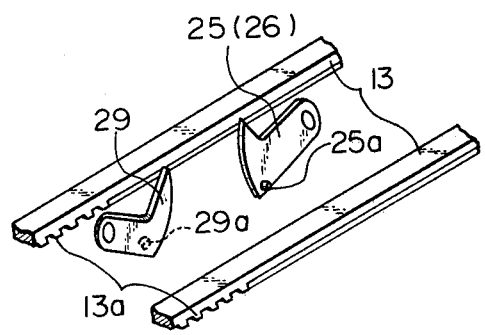
FIG. 3 is a fragmentary perspective view showing the relationship between the mount push-up claws and the mount driving belts.
Figure 6:
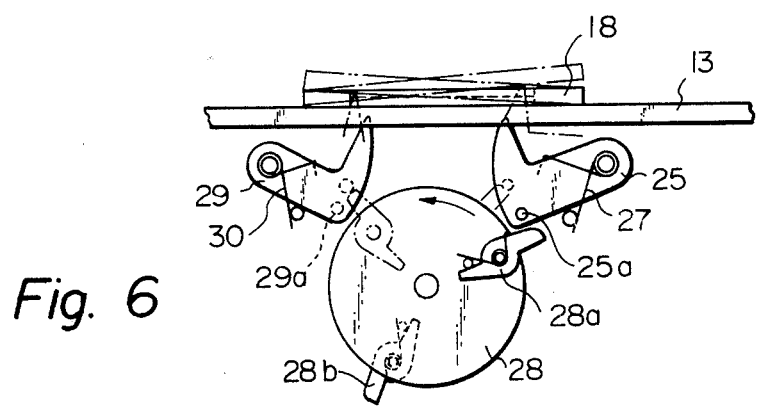
FIG. 6 is a view showing the manner how the mount push-up claws are operated.

As described later in detail, a swingable mount push-up claw 25 (26) is provided adjacent to the opening of each magazine 15 (14) between the pair of belts 13 as shown in FIGS. 1, 3 and 6 so that, when the claw is moved upwardly the mount 18 in the magazine is retracted inwardly of the magazine.

FIG. 6 shows the mount push-up mechanism. Since the claw 26 is similar to the claw 25 in construction but is arranged in symmetrical relation thereto, it suffices to describe the construction and operation of the mount push-up mechanism relating to the claw 25. As shown in FIG. 6, the claw 25 has a pin 25a secured thereto and is urged by a spring 27 in the counterclockwise direction and is limited its movement by a pin secured to the frame of the projector for supporting one end of the spring 27. A rotatable actuating disc 28 is driven by the motor 7 so as to rotate in synchronized relation to the movement of the belts 13. The disc 28 has in its one surface a swingable claw 28a pivoted thereto and engageable with the pin 25a while a further swingable claw 28b is pivoted to the other surface of the disc 28. The claw 28a is urged in the clockwise direction by a spring and limited its movement by a pin securing one end of the spring. In like manner, the claw 28b is urged in the counterclockwise direction and limited its movement as shown. A further mount push-up claw 29 for pushing up the mount when the belts are driven in the reverse direction is pivoted to the frame and has a pin 29a secured thereto on the surface opposite to the surface of the claw 25 to which the pin 25a is secured. The pin 29a is positioned so as to be engageable with the claw 28b while the claw 29 is urged by a spring 30 in the clockwise direction and limited its movement in like manner as the claw 25.

Figure 8:
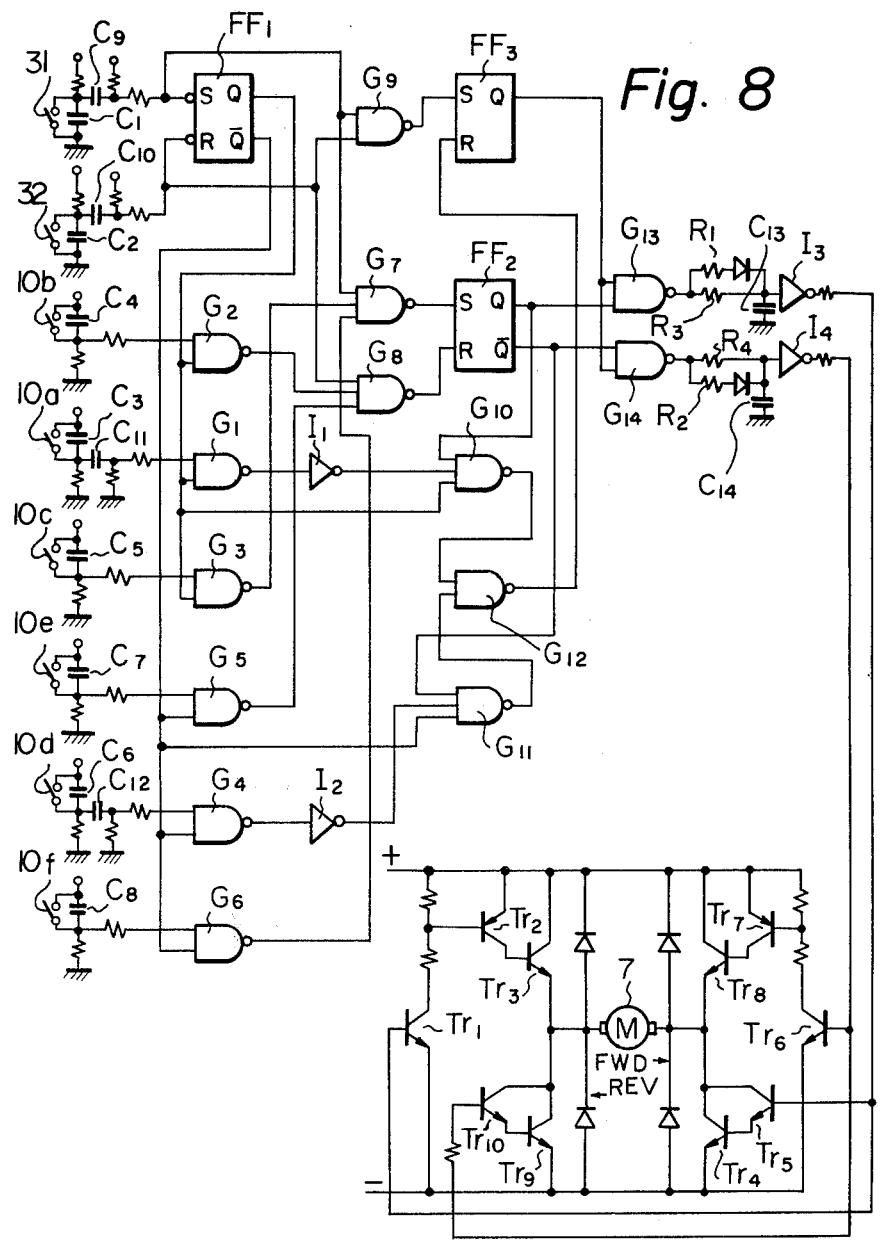
FIG. 8 is a circuit diagram showing the control circuit for the projector shown in FIG. 1.

FIG. 8 shows the control circuit of the projector shown in FIG. 1. The control circuit shown comprises a forward driving switch 31 and a reverse driving switch 32 for transporting the mount in the respective directions, condensers $C_1$, $C_2$ each connected in parallel to the switch 31 or 32, forward driving detection switches 10a–10c, chattering preventing condensers $C_3$–$C_5$ each connected in parallel to the respective switch 10a, 10b, 10c, reverse driving detection switches 10d–10f, chattering preventing condensers $C_6$–$C_8$ each connected in parallel to the respective switch 10d, 10e, 10f, differentiating condensers $C_9$–$C_{12}$ each connected to the respective one of the switches 31, 32, 10a and 10d, a flip-flop $FF_1$ with its set input terminal S connected to the forward driving switch 31 and its reset input terminal R connected to the reverse driving switch 32 for switching the forward and the reverse driving detection switch 10a, 10d, NAND gates $G_1$–$G_3$ with their one input terminals connected commonly to the output terminal Q of the flip-flop $FF_1$ while their other input terminals are connected to the respective forward driving detection switches 10a–10c, NAND gates $G_4$–$G_6$ with their one input terminals connected commonly to the inverted output terminal $\overline{Q}$ of the flip-flop $FF_1$ while their other input terminals are connected to the respective reverse driving detection switches 10d–10f, and a flip-flop $FF_2$ for determination of the forward or reverse driving condition with its set input terminal S connected to the output terminal of a NAND gate $G_7$ having its input terminals connected respectively to the forward driving switch 31, the output terminals of the respective NAND gates $G_3$ and $G_6$ while the reset input terminal R of the flip-flop $FF_2$ is connected to the output terminal of a NAND gate $G_8$ the input terminals of which are connected respectively to the reverse driving switch 32, and the output terminals of the respective NAND gates $G_2$ and $G_5$.

A flip-flop $FF_3$ for stopping the operation has the set input terminal S connected to the output terminal of a NAND gate $G_9$ the input terminals of which are connected respectively to the forward and the reverse driving switch 31, 32, while the reset input terminal R of the flip-flop $FF_3$ is connected to the output terminal of a NAND gate $G_{12}$ the input terminals of which are connected respectively to the output terminal of a NAND gate $G_{10}$ having its input terminals connected to the output terminal Q of the flip-flop $FF_2$, the output terminal of the NAND gate $G_1$ through an inverter $I_1$ and the output terminal Q of the flip-flop $FF_1$ and the output terminal of a NAND gate $G_{11}$ having its input terminals connected respectively to the inverse output terminal $\overline{Q}$ of the flip-flop $FF_2$, the inverse output terminal $\overline{Q}$ of the flip-flop $FF_1$ and the output of the NAND gate $G_4$ through an inverter $I_2$. NAND gates $G_{13}$, $G_{14}$ have their one input terminals connected commonly to the output terminal Q of the flip-flop $FF_3$ while their other input terminals are connected respectively to the output terminal Q and the inverse output terminal $\overline{G}$ of the flip-flop $FF_2$. A series circuit consisting of a resistor $R_1$, a diode and a condenser $C_{13}$ is connected between the output terminal of the NAND gate $G_{13}$ and the ground so that a charging circuit is formed by the series circuit, while a discharging circuit is formed by the condenser $C_{13}$ together with a resistor $R_3$ connected between the output terminal of the NAND gate $G_{13}$ and the condenser $C_{13}$. In like manner, a charging circuit is formed by a series circuit consisting of a resistor $R_2$, a diode and a condenser $C_{14}$ connected between the output terminal of the NAND gate $G_{14}$ and the ground while a discharging circuit is formed by the condenser $C_{14}$ and a resistor $R_4$ connected between the output terminal of the NAND gate $G_{14}$ and the condenser $C_{14}$. The resistance value of the resistor $R_3$ is set to be greater than that of the resistor $R_1$, while the resistance value of the resistor $R_4$ is set to be greater than that of the resistor $R_2$.

A forward driving circuit for the motor 7 consisting of transistors $Tr_1$–$Tr_5$ connected as shown in FIG. 8 is connected to the output terminal of an inverter $I_3$ the input terminal of which is connected to the junction of the condenser $C_{13}$ and the series circuit consisting of the resistor $R_1$ and the diode so that the transistors $Tr_1$–$Tr_5$ are rendered to be conductive by the high level ouput H of the inverter $I_3$ so as to drive the motor 7 in the forward direction. In like manner, the transistors $Tr_6$–$Tr_{10}$ connected as shown in FIG. 8 constitute a reverse driving circuit for the motor 7 and it is connected to the output terminal of an inverter $I_4$ having its input terminal connected to the junction of the condenser $C_{14}$ and the series circuit consisting of the resistor $R_2$ and the diode. Thus, the transistors $Tr_6$–$Tr_{10}$ are rendered to be conductive by the high level output H of the inverter $I_4$ so as to drive the motor 7 in the reverse direction.

In operation of the above described projector starting from the initial position at which a mount 18 can be held in alignment with the projector aperture 6a of the gate 6 by means of the shoulder portions 13b or 13c of the belts 13, when the forward driving switch 31 is actuated, the motor 7 is driven in the forward direction thereby moving the belts 13 in the forward direction as shown by the arrow in FIG. 1 through the gears 7a, 8a, 8b and 11a while the detection disc 9b is rotated in the direction as indicated by the arrow in FIG. 1 through the gears 7a, 8a, 9a. The movement of the belts 13 is also shown in FIG. 7a.

Figure 7A:
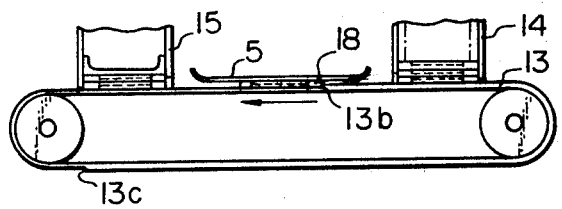
FIGS. 7a-7d are views showing respectively the manner how the belts move the mount from one magazine to another magazine.

Thus, the mount 18 engaging with the shoulder portions 13b shown in FIG. 7a is moved to the left together with the belts 13. At the same time, upon closure of the forward driving switch 31 in the control circuit shown in FIG. 8, a low level signal L is generated so that the flip-flop $FF_1$ is set thereby opening the NAND gates $G_1$–$G_3$ by the output of the flip-flop $FF_1$. And the output of the NAND gate $G_9$ is changed to high H by the above low level signal L so that the flip-flop $FF_3$ is set thereby issuing high level signal H from the output terminal Q of the flip-flop $FF_3$. Thus, the NAND gates $G_{13}$, $G_{14}$ are opened. The input terminal of the NAND gate $G_7$ also receives the above low level signal L so that a high level output H is generated at the output terminal of the NAND gate $G_7$. Thus, the flip-flop $FF_2$ is set and high level signal H is generated at the output terminal Q of the flip-flop $FF_2$ thereby rendering the output of the NAND gate $G_{13}$ to be low L. Therefore, a high level signal H is given through the inventor $I_3$ to the forward driving circuit of the motor 7 consisting of the transistors $Tr_1$–$Tr_5$ so as to drive the motor 7 in the forward direction.

Figure 7B:
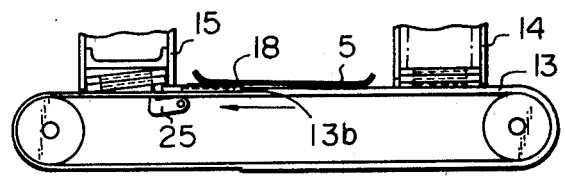
Figure 7C:
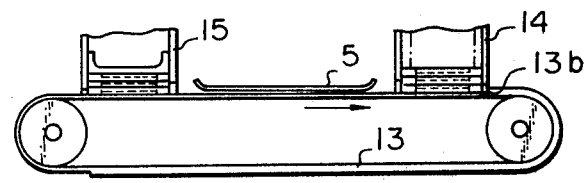

On the other hand, the actuating disc 28 is rotated in the direction of the arrow in FIG. 6 in synthronism with the movement of the belts 13 while the detecting disc 9b is rotated in synchronism with the belts 13. Thus, the claw 28a engages with the pin 25a of the mount push-up claw 25 immediately before the moving mount 18 reaches the magazine 15, so that the claw 25 is pushed up to the position shown by the chain line in FIG. 6 and the mounts 18 already received in the magazine 15 are pushed upwardly as shown in FIG. 7b, thereby permitting the moving mount 18 on the belts 13 to be received in the magazine 15 without hindrance by the interference of the already received mounts 18. The pin 25a is disengaged from the claw 28a immediately before the moving mount 18 abuts against the claw 25 which causes the claw 25 to return to its initial position shown by the solid line in FIG. 6 by the action of the spring 27 allowing free movement of the mount 18 without hindrance by the claw 25. When the moving mount 18 has been completely received in the magazine 15, the detecting switch 10b is actuated by the cam portion 96bb of the detecting disc 9b as it rotates, so that an inverted signal is generated. This signal is applied to the NAND gate $G_8$ through the NAND gate $G_2$ so that high level signal H is generated which resets the flip-flop $FF_2$ which has been in set condition, thereby permitting the flip-flop $FF_2$ to be inverted to render the output of the NAND gate $G_{14}$ to be low L. Thus, the high level output H of the invert $I_4$ is applied to the reverse driving circuit consisting of the transistors $Tr_6$–$Tr_{10}$ to thereby render them to be conductive so as to drive the motor 7 in the reverse direction. As a result, the belts 13 are also moved in the reverse direction. In this case, however, the mount 18 which has just been received in the magazine 15 will slide over along the surface of the belts 13, so that it will not be pulled out of the magazine 15. When the belts 13 are moved in the direction shown by the arrow to the positions shown in FIG. 7c, the cam portion 9bb of the detecting disc 9b which is rotating in synchronism with the belts 13 actuates the switch 10c so as to issue inverted signal. In this case, however, the cam portion 9bb has actuated the switch 10a before the switch 10c is actuated, so that high level signal H is applied to the NAND gate $G_{10}$ through the NAND gate $G_1$ and the inverter $I_1$, but no influence is given to the motor 7, because the flip-flop $FF_2$ has been reset and the NAND gate $G_{10}$ has been closed.

Therefore, the inverted signal issued from the switch 10c renders the output of the NAND gate $G_3$ to be low L, so that the output of the NAND gate $G_7$ becomes high H thereby inverting the flip-flop $FF_2$ again so as to be in the reset condition. That is, the forward driving circuit consisting of the transistors $Tr_1$–$Tr_5$ is actuated so as to drive the motor 7 in the forward direction. By the movement of the belts 13 in the direction opposite to the arrow from the positions shown in FIG. 7c, the shoulder portions 13b of the belts 13 engage with the frontmost mount 18 in the magazine 14 and urge it out of the magazine 14 to the position in alignment with the aperture 6a of the film projection gate 6 and hold it thereat. That is, when the mount 18 is moved to the aperture 6a as shown in FIG. 7a, the cam portion 9bb of the detecting disc 9b again actuates the switch 10a so as to generate low signal L at the output of the NAND gate $G_1$, thereby rendering the output of the NAND gate $G_{10}$ to be low L through the inverter $I_1$. Thus, high level signal H is generated at the output of the NAND gate $G_{12}$ to render the flip-flop $FF_3$ to be reset so that low level signal L appears at the output terminal Q of the flip-flop $FF_2$. As a result, both the NAND gates $G_{13}$, $G_{14}$ are shut off to deenergize the motor 7. At this time, the mount 18 moved by the belts 13 is held in alignment with the aperture 6a to enable the image of the film 18a in the mount 18 to be projected.

Figure 7D:
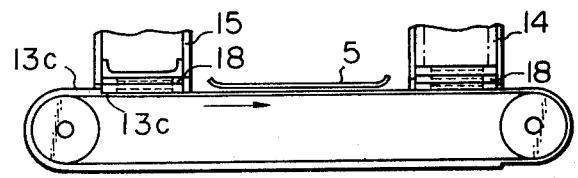

In order to permit the mounts 18 which has been transported into the magazine 15 to be returned to the magazine 14, the reverse driving switch 32 is actuated. Then, the flip-flop $FF_1$ is reset to issue high level signal H from the inverted output terminal $\overline{Q}$ in like manner as the actuation of the forward driving switch 31. Thus, the NAND gates $G_4$–$G_6$ are opened. On the other hand, high level signal H appears at the output of the NAND gate $G_9$ in like manner as in the case of the forward driving of the motor 7 so that the flip-flop $FF_3$ is set thereby opening the NAND gates $G_{13}$, $G_{14}$. At the same time, since high level signal H appears at the inverted output terminal $\overline{Q}$ of the flip-flop $FF_2$ which is reset by the application of high level signal H of the NAND gate $G_8$ to the reset input terminal R of the flip-flop $FF_2$, the output of the NAND gate $G_{14}$ is rendered to be low L, so that the transistors $Tr_6$–$Tr_{10}$ forming the reverse driving circuit are rendered to be conductive through the inverter $I_4$ thereby driving the motor 7 in the reverse direction. Thus, the belts 13 are moved from the position shown in FIG. 7a in the direction opposite to the arrow shown therein, and the shoulder portions 13c of the belts 13 approach the mount 18 in the magazine 15 as shown in FIG. 7d. In this case, however, the mount 18 held aligned with the aperture 6a slides over along the belt 13 due to the low coefficient of friction of the surface of the belts 13. At the same time, since the actuating disc 28 is rotating in the clockwise direction opposite to the arrow shown in FIG. 6, the claw 28b abuts against the claw 29 and pushes it upwardly so that the left hand sides of the mounts 18 in the magazine 15 are pushed upwardly as shown by the two dot chain line in FIG. 6 thereby permitting the shoulder portions 13c of the belts to freely move beneath the mounts 18 in the magazine 15 without engaging therewith. Thus, the shoulder portions 13c of the belts 13 abut against the mount 18 held in alignment with the aperture 6a. At the same time, the switch 10d is actuated by the cam portion 9bb so that the motor 7 is stopped in like manner as in the case of the actuation of the switch 10a with the mount 18 on the belts 13 being held in alignment with the aperture 6a. Thereafter, upon actuation of the reverse driving switch 32, the belts 13 are moved in the reverse direction so that the mounts 18 in the magazine 15 are successively transported in the magazine 14 in like manner as in the case of the previously described forward movement of the belts 13 for the transport of the mounts 18 from the magazine 14 to the magazine 15.

FIG. 6 shows the actuating mechanism relating to the actuating disc 28 for the forward and reverse driving of the belts 13 which is arranged at the side of the magazine 15. Similar mechanism is arranged at the side of the magazine 14 for the similar function relating thereto.

The magazines 14, 15 can be detached from the projector and can be utilized as storage cases applying covers (not shown) on the magazines 14, 15.

Figure 9:
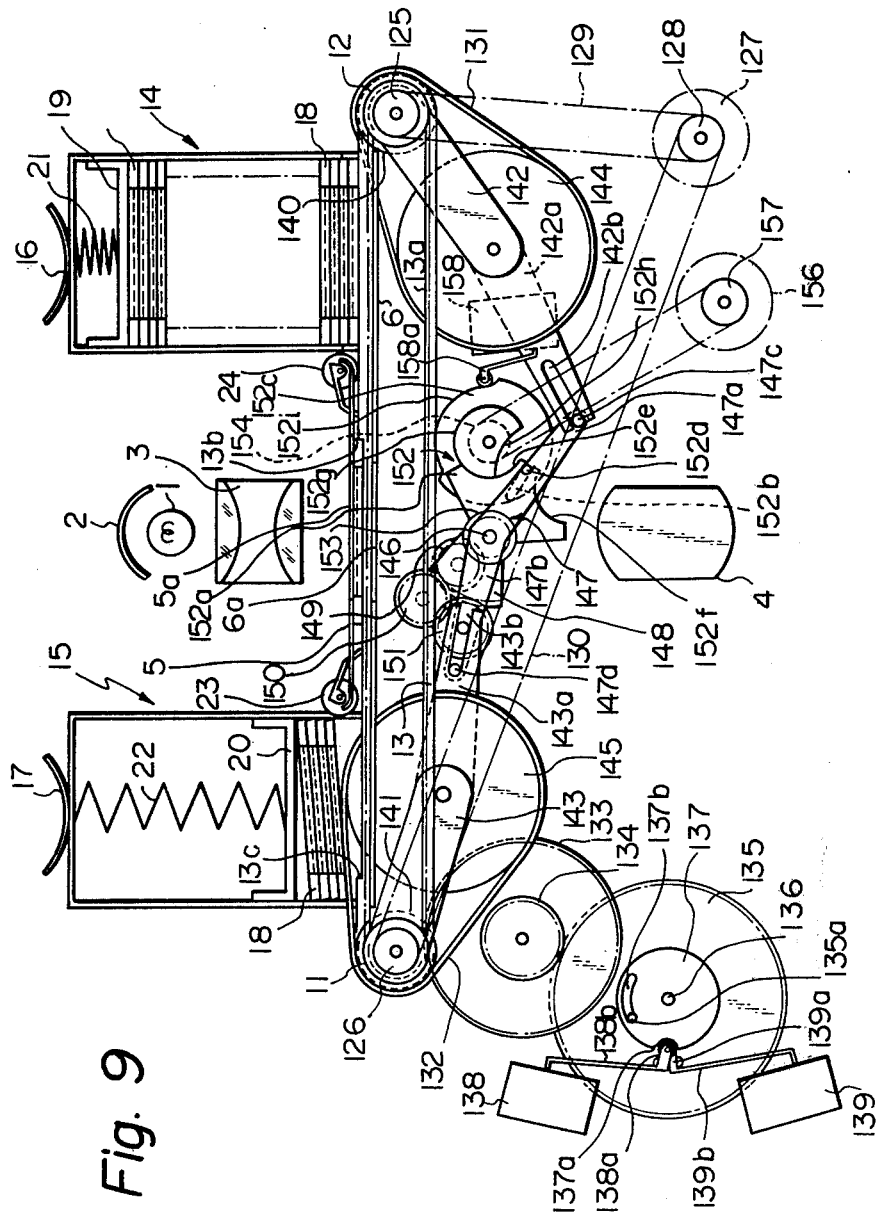
FIG. 9 is a plan view similar to FIG. 1 but showing another projector incorporating a modified form of the device of the present invention.

FIG. 9 shows a slide film projector incorporating another embodiment of the mount transporting device of the present invention in which the belts are moved in one and the same direction during one cycle of the operation.

The projector shown in FIG. 9 is generally of the similar construction as that shown in FIG. 1 and comprises a lamp 1, a reflector 2, a condenser lens 3, a projecting lens 4, a pressure plate 5 having an aperture 5a, a film projection gate 6 having an aperture 6a, belt drive and guide rollers 11, 12, mount driving belts 13 having at least a pair of opposing stepped shoulder portions 13b, 13c and gear teeth 13a, magazines 14, 15, springs 16, 17, mount pressing plates 19, 20, springs 21, 22, double mount feeding prevention rollers 23, 24, all of which are similar in construction and function as those shown in FIG. 1.

In order to drive the belts 13, in either of the opposite two directions, a reversible motor 127 is provided and a toothed belt 129 is stretched between a toothed pulley 128 integral with the shaft of the motor 127 and a toothed pulley 125 integral with the roller 12 so as to drive the roller 12 and another toothed belt 130 is stretched between a toothed pulley 126 integral with the roller 11 and the toothed pulley 128 so as to drive the roller 11 in the same velocity with that of the roller 12.

One cycle of mount transporting operation in the leftward movement of the upper stretches of the belts, for example, is so effected that a mount 18, positioned in alignment with the aperture 6a with its right side edge engaging with the shoulder portions 13b of the belts 13 in the initial position of the projector as shown in FIG. 9, is moved to the left together with the belts 13 and received in the magazine 15, thereafter, the belts 13 are further driven in the same direction leaving the mount 18 in the magazine 15 so that the shoulder portions 13b approach and enter the right side inlet of the magazine 14 thereby catching the frontmost mount 18 in the magazine 14 so as to move it to the position in alignment with the aperture 6a together with the belts 13, and finally the belts 13 are stopped to complete one cycle of operation wherein the mount 18 therein is held in alignment with the aperture 6a so as to be ready for the projection of the image in the film 18a of the mount 18. In operation in the reverse direction, the shoulder portions 13c of the belts 13 are held abutting against the left side edge of the mount 18 supported on the belts 13 in the initial position of the projector and the belts 13 are moved to the right thereby permitting the mount 18 on the belts 13 to be received and stored in the magazine 14 and, upon further movement of the belts 13, the shoulder portions 13c engage with the frontmost mount 18 in the magazine 15 and move it to the position in alignment with the aperture 6a and the belts 13 are stopped so as to hold the mount 18 in alignment with the aperture 6a.

In place of the claws 25, 29 for pushing the mounts 18 in the magazine 14 or 15 inwardly so as to clear the space in the magazine to permit the new mount 18 to be received in the magazine, mount push-in belt means are provided in the respective magazines 14, 15.

The mount push-in means for the magazine 14 comprises an endless belt 131 stretched between a roller 140 integral with the roller 12 but having a larger diameter than that of the roller 12 and a roller 144 having a substantially large diameter rotatably supported in the free ends of a pair of swingable levers 142 freely pivoted at their proximal ends on the axis of the roller 12 so that the portion of the belt 131 stretched around the roller 144 can be moved into the interior of the magazine between the belts 13 so as to push the mounts 18 in the magazine inwardly thereof so as to space the same from the belts 13 and out of the magazine 14 to permit the frontmost mount 18 to contact with the belts 13 by the swinging movement of the levers 142. In the similar manner, an endless belt 132, a roller 141, a roller 145 and a pair of levers 143 are provided as the mount push-in means for the magazine 15.

In order to alternately move either one of the belts 131, 132 into the interior of the magazine 14 or 15, an elongated arm 142a is provided extending from the free end of one of the levers 142 and having a longitudinal groove 142b in the free end thereof. Similarly, an elongated arm 143a extends from the free end of one of the levers 143 and a longitudinal groove 143b is formed in the free end thereof. A switching lever 147 having a sector gear 148 integral therewith is pivoted at its center on a shaft 146 secured to the frame of the projector and a pin 147c is secured to the free end of an arm 147a of the lever 147 which slidably engages with the groove 142b of the arm 142a. In the similar way, a pin 147d is secured to the free end of another arm 147b of the lever 147 which slidably engages with the groove 143b of the arm 143a. Thus, when the lever 147 is swung in the counterclockwise direction from the position shown in FIG. 9 wherein the belt 132 is moved into the magazine 15, the belt 132 is moved out of the magazine 15 while the belt 131 is moved into the magazine 14 to push the mounts 18 therein inwardly.

In order to reciprocally swing the lever 147 between two positions so as to upwardly or downwardly move the belts 131, 132 alternately as described above, a motor 156 is provided and a toothed belt 155 is stretched between a toothed pulley 157 integral with the shaft of the motor 156 and a toothed pulley 154 integral with a cam disc 152c having a recessed cam surface 152i of a Geneva movement mechanism 152 consisting of a cam 152g integral with the cam disc 152c and having an escapement recess 152b, a switchable lever 152a freely pivotable around the shaft 146 and having a pair of positioning recessed cam surfaces 152e, 152f as well as a radially extending groove 152b slidably engaging with a pin 152d secured to the cam disc 152c and a gear 153 integral with the lever 152a. The gear 153 is drivingly coupled with the sector gear 148 through a gear train consisting of gears 149, 150, 151 as shown.

Thus, when the motor 156 is driven in one or the opposite direction, the lever 152a of the Geneva movement mechanism 152 is swung between the two positions by the pin 152d so that the lever 147 is swung through the gear train and the arms 142a and 143a are swung oppositely to each other to change the positions of the belts 131, 132 alternately. The switch 158 having an actuating arm 158a contacting with the cam surface 152i serves to deenergize the motor 156 upon completion of the switching operation of the lever 152a, and, hence, the levers 142 and 143.

The motor 156 may be dispensed with and the motor 127 may be commonly for the operation of the motor 156 by providing appropriate clutch means.

In order to stop the movement of the belts 13 in either of the opposite two directions at the end of each cycle of operation, a pair of unidirectionally actuatable switches 138 and 139 are provided either one of which is actuated at the end of each cycle so as to stop the motor 127 depending upon the direction of movement of the belts 13. To this end, a gear integral with the roller 12 (or 11) is provided which meshes with a gear 133. A pinion 134 integral with the gear 133 meshes with a gear 135 supported by a shaft 136 which gear 135 is adapted to drive a cam disc 137. Thus, the cam disc 137 is driven in one or the opposite direction in synthronism with the movement of the belts 13 depending upon the direction of movement thereof.

The cam disc 137 has a recessed cam surface 137a with which the actuator 138a of an arm 138b of the switch 138 and the actuator 139a of an arm 139b of the switch 139 are adapted to be engaged as the cam disc 137 rotates one revolution corresponding to the movement of the shoulder portions 13b (or 13c) by the distance between the shoulder portions 13b (or 13c) of one pair of the shoulder portions 13b, 13c and the shoulder portions 13b (or 13c) of the adjacent pair (if a plurality of pairs are provided) so that either one of the switches 138, 139 is actuated depending upon the direction of movement of the belts 13 so as to stop the motor 127 so as to locate the belts 13 in position at the end of each cycle of operation.

As previously described, the distance between the shoulder portions 13b and 13c of each pair is greater than the width of the mount 18. Therefore, compensating means must be provided in order to stop the belts 13 and locate the shoulder portions 13b or 13c accurately in position depending upon the direction of movement of the belts 13 at the end of each cycle for positioning the mount 18 thereon in alignment with the aperture 6a even though the direction of movement of the belts 13 in the next cycle of operation is reversed to the opposite direction from that of the previous cycle. Such compensating means must give idle running of the belts 13 corresponding to the difference between the spacing of the opposing shoulder portions 13b, 13c of each pair in the belts 13 and the width of the mount 18 while the cam disc 137 is held stationarily. This can be given by rendering the cam disc 137 to be freely rotatable about the shaft 136 and by slidably engaging a pin 135a secured to the gear 135 (or the cam disc 137) within an elongated arcuate groove 137b formed in the cam disc 137 (or the gear 135), the length of the groove 137b being so set that the maximum relative rotation angle allowed between the gear 135 and the cam disc 137 as determined by the movement of the pin 135a from one end of the groove 137b to the other end thereof corresponds to the movement of the belts 13 by the length equal to the spacing between the opposing shoulder portions 13b and 13c of each pair minus the width of the mount 18.

The operation of the device shown in FIG. 9 is substantially similar to that of the device shown in FIG. 1 except that the belts 13 are moved in one and the same direction during each cycle of operation in either of the opposite two directions of movement of the belts 13, and that the mount 18 which is being brought into the magazine 15 (or 14) by the belts 13 is moved by the belt 132 (or 131) faster that the speed of the belts 13 because of the larger diameter of the roller 141 (or 140) than that of the roller 11 (or 140) thereby permitting the mount 18 to be positively disengaged from the shoulder portions 13b (or 13c) of the belts 13 so as to insure that the mount 18 is received in position in the magazine 15 (or 14) without hindrance by the interference of the shoulder portions which might otherwise cause seizure or sticking to the mount 18.

Figure 10:
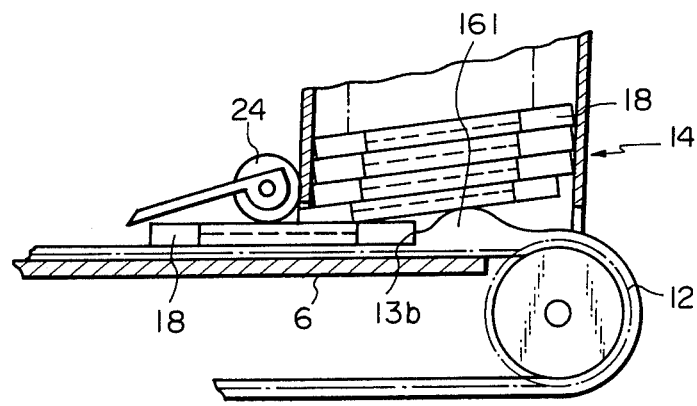
FIG. 10 is a fragmentary view showing a modified form of the mount driving belts.

FIG. 10 shows a modified form of the belts 13 permitting the frontmost mount 18 in the magazine 14 or 15 to be smoothly pushed out therefrom without hindrance due to seizure or sticking of the projecting fins or deformed portions formed in the edge of the opening of one mount 18 with the adjacent relatively moving mount 18.

To this end, a raised portion 161 is formed in the surface of each belt 13 at the thicker side of the respective shoulder portion 13b, 13c closely adjacent thereto as shown in FIG. 10.

By virtue of the provision of the raised portion 161, all the mounts located above the frontmost mount 18 which is to be pushed out of the magazine 14 (or 15) by the shoulder portion 13b (or 13c) as the belts 13 are moved are urged upwardly apart from the upper surface of the moving mount 18 so that the above described seizure or sticking is positively avoided.

Figure 13:
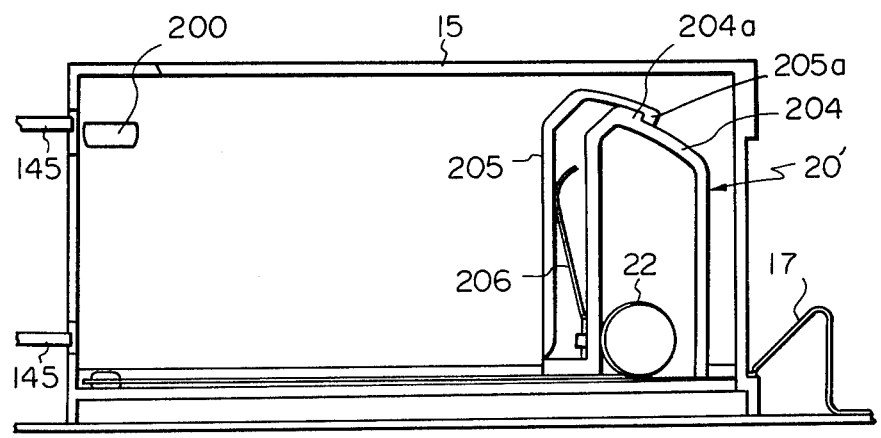
FIG. 13 is a cross-sectional view showing the internal construction of the magazine of FIG. 12.
Figure 11:
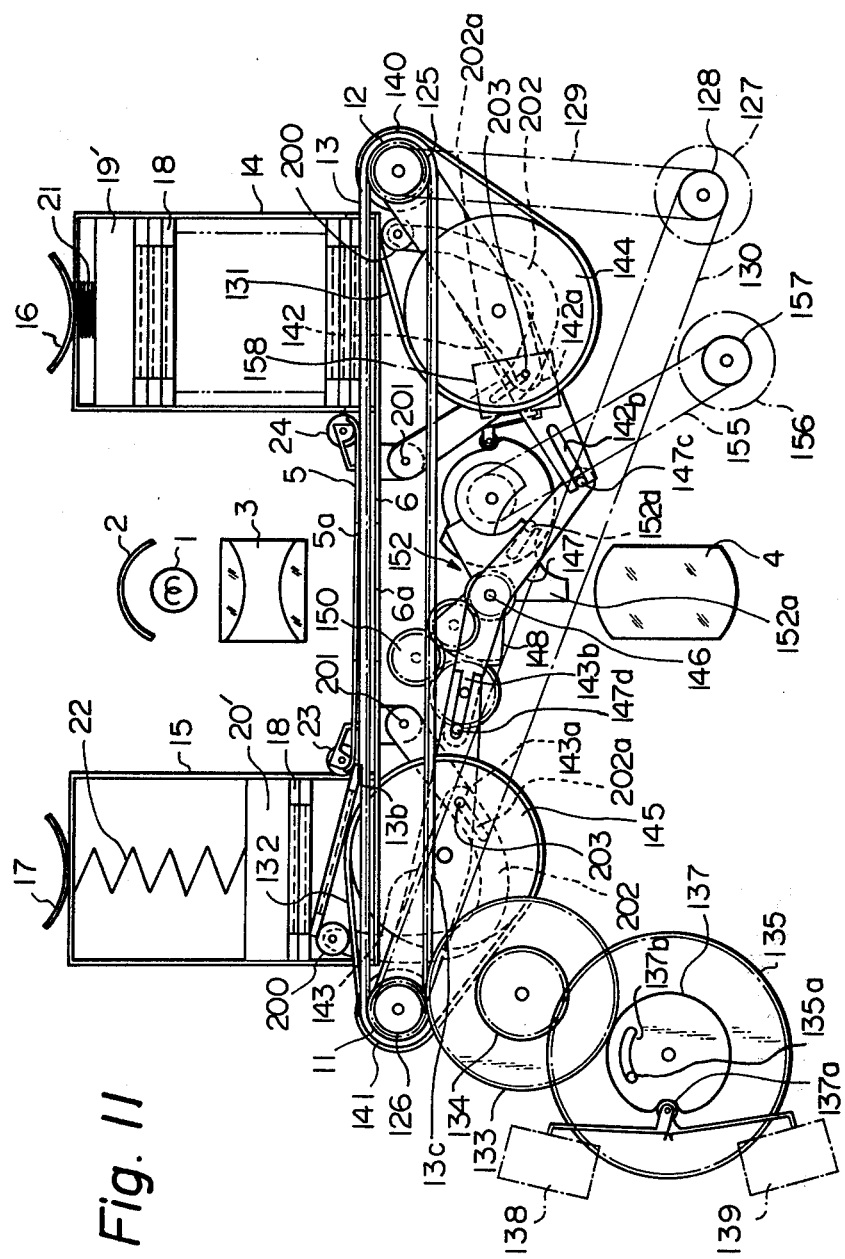
FIG. 11 is a plan view similar to FIG. 1 but showing a still further projector incorporating a further modified form of the device of the present invention.
Figure 12:
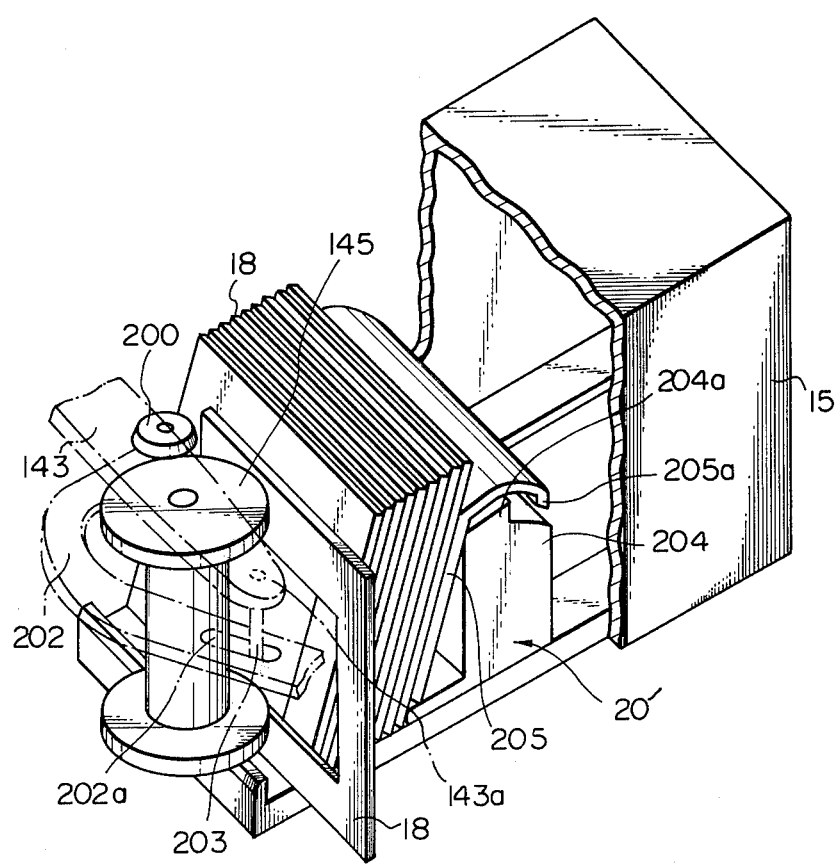
FIG. 12 is a perspective view with a portion partly broken showing the internal construction of a modified form of the magazine.

FIGS. 11-13 show a still further modification of the device of the present invention permitting the mount 18 to be smoothly received in the magazine 14 or 15 without hindrance by seizure or sticking of projecting fins or deformed portions formed in the edge of the opening in the mount 18 to the adjacent relatively moving mount 18.

The projector shown in FIG. 11 is substantially similar in construction and operation to that of FIG. 9 except the provision of a mount push roller 200 movable into or out of each magazine 14, 15 so that it urges the mounts 18 already received in the magazine in the interior thereof when the new mount 18 is being received in the magazine so as to space the mounts 18 from the upper surface of the mount 18 which is being received in the magazine so that seizure or sticking of the fins or the deformed portions formed in the edge of the opening of the mount 18 to the adjacent relatively moving mount 18 is positively prevented.

To this end, the roller 200 for either of the magazines 14, 15 is freely rotatably supported on the free end of a U-shaped lever 202 which is swingably supported at its proximal end by a shaft 201 to the frame of the projector so that the roller 200 can be moved into the interior of the magazine 14, 15 at the upper side thereof as shown in FIG. 12 and out therefrom. In order to swing the lever 202 in timed relationship to the movement of the mount 18 which is being received in the magazine, a pin 203 is secured to the extended portion 143a (or 142a) of the lever 143 (or 142) as shown in FIGS. 11 and 12 and the pin 203 is slidably received in an elongated groove 202a formed in the lever 202 so that, when the lever 143 (or 142) is moved upwardly as seen in FIG. 11 so as to move the the belt 132 (or 131) into the magazine 15 (or 14), the lever 202 is also swung upwardly as seen in FIG. 11 to move the roller 200 into the interior of the magazine 15 (or 14) thereby rendering the mounts 18 already received in the magazine 15 (or 14) to be held inclined with the upper edges of the mounts 18 further urged into the interior of the magazine as shown in FIG. 12.

To permit the mounts 18 to be inclined as described above, the mount pressing plate 20' (or 19') is constituted by a slider body 204 slidable in the magazine by the action of the spring 22 (or 21) or against the action thereof and having a latch portion 204a at its upper edge, a swingable plate 205 having a latch portion 205a at its upper edge which engages with the latch portion 204a of the slider body 204 and a leaf spring 206 secured to the body 204 and urging the plate 205 to be swung forwardly apart from the body 204 about the latch portion 204a.

Thus, as the mount 18 is moved into the magazine 15 (or 14) by the movement of the belts 13 while the mount 18 is urged upwardly in FIG. 11 by the belt 132 (or 131), the upper sides of the mounts 18 already housed in the magazine 15 (or 14) are urged by the roller 200 inwardly of the magazine so as to be inclined as shown in FIG. 12 by virtue of the upper edge 205a of the plate 205 being moved rearwardly of the magazine against the action of the leaf spring 206 thereby insuring that the front surface of the frontmost mount 18 already housed in the magazine will not contact with the surface of the incoming mount 18 so that hindrance of the movement of the incoming mount 18 will be avoided due to engagement thereof with the fins or deformed portions formed in the edge of the opening of the frontmost mount 18 already housed in the magazine 15 (or 14).

Figure 14:
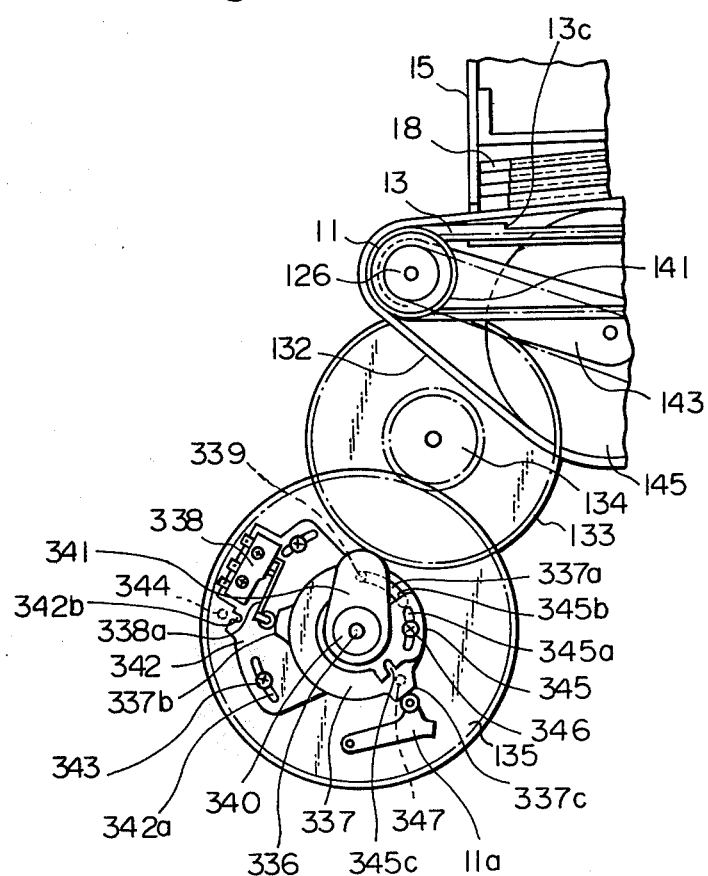
FIG. 14 is a plan view similar to FIG. 1 but showing a slide film projector incorporating a still further modified form of the device of the present invention.
Figure 15:
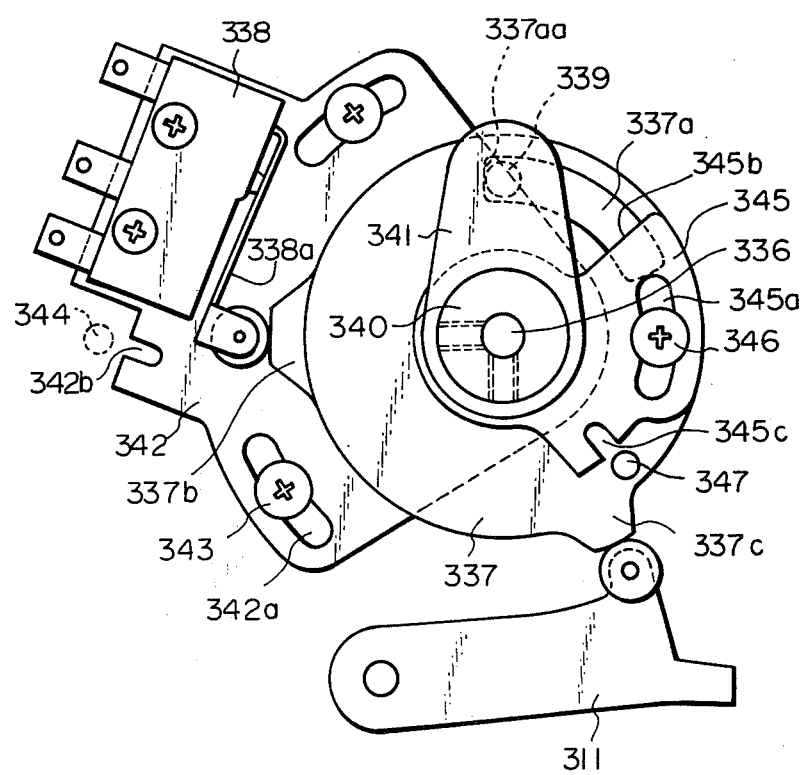
FIG. 15 is a view showing the construction of the switch shown in FIG. 14 which enables fine adjustments for the accurate positioning of the belts at the end of each cycle in either of the opposite two directions of the movement thereof.

FIGS. 14 and 15 show a modified form of the switch 338 which may be used in place of the pair of unidirectionally operable switches 138, 139 shown in FIG. 9 and in which fine adjustments of the position of the switch 338 relative to the cooperating components can be effected in order to compensate for the dimensional errors in the parts and the accumulative errors in assembling the parts as well as to compensate for the errors occurring when the belts 13 are moved in the reverse direction due to backlashes between the mutually engaging parts so that accurate timing of the operation is insured for positioning the mount 18 in alignment with the film projecting aperture 6a at the end of each cycle of operation in either of the opposite two directions of movement of the belts 13.

The shaft 336 integral with the gear 135, which is similar to the gear 135 shown in FIG. 9 but which is not provided with any pin corresponding to the pin 135a shown in FIG. 9, protrudes upwardly beyond the cam disc 337 which is freely rotatably supported thereon and in which an elongated arcuate elongated groove 337a is formed which is similar to the groove 137b shown in FIG. 9 but has a certain excessive length in comparison with that of the groove 137b.

A raised cam portion 337b and a further raised cam portion 337c which is axially offset with respect to the cam portion 337b thereby preventing interference therewith are formed in the outer periphery of the cam disc 337. The cam portion 337b is adapted to cooperate with the actuator 338a of the switch 338 for stopping the driving motor at the end of each cycle of operation in like manner as previously described, while the cam portion 337c cooperates with an actuating lever 311 for actuating shutter means (not shown) for the aperture 6a in timed relation to the movement of the belts 13, for example, so that the aperture 6a is held closed during the time the mount 18 is being transported.

In order to drive the cam disc 337 by the rotation of the shaft 336, a bush 340 is secured to the protruded upper end of the shaft 336 to which a lever 341 having a pin 339 secured at the free end thereof is integrally secured. The pin 339 is slidably received in the groove 337a of the cam disc 337 so that it is rotated by the rotation of the shaft 336 with an idle running of the belts 13 being provided when the direction of the belts 13 is reversed by virtue of the slidable engagement of the pin 339 with the groove 337a in like manner as previously described.

In order to accurately position the switch 338 with respect to the cam disc 337, the switch 338 is mounted on a switch mounting plate 342 rotatable about the shaft 336 and adjustingly secured to the frame of the projector by means of set screws 343 received in arcuate grooves 342a of the plate 342 and threaded into the frame.

Further, in order to accurately adjust the timing of the termination of the driving of the motor when the direction of movement of the belts 13 and, hence, the direction of rotation of the cam disc are reversed, a groove limiting plate 345 is rotatably mounted on the cam disc 337 and is adjustingly secured thereto by means of a set screw 346 passing through an arcuate groove 345a formed in the plate 345 and threaded into the cam disc 337.

In the adjustment, the position of the switch mounting plate 342 is first adjusted and fixed with respect to the cam disc 337 under the condition that the pin 339 is held abutted against one end 337aa of the groove 337a in the cam disc 337 wherein a mount 18 is accurately positioned in alignment with the aperture 6a by the abutment of the shoulder portions 13b of the belts 13 against the right hand edge of the mount 18 so as to set the accurate timing in the operation in the forward movement of the belts 13.

Then, the position of the groove limiting plate 345 is adjusted wherein the limiting edge 345b of the plate 345 is so set that the pin 339 just abuts against the edge 345b when the belts 13 is moved in the reverse direction together with the clockwise rotation of the pin 339 about the shaft 336 so that the shoulder portions 13c of the belts 13 abut against the left hand edge of the mount 18 which is held in alignment with the aperture 6a.

Thus, the fine adjustment of the timing in the forward movement of the belts 13 is effected by the switch mounting plate 342 while the fine adjustment of the timing in the reverse movement of the belts 13 is then effected by the groove limiting plate 345.

In operation of the device shown in FIG. 14, a forward driving or a reverse driving button (not shown) is operated so that control circuit is actuated whereby the belts 13 and the cam disc 337 are driven by the motor in the forward or in the reverse direction, then the actuator 338a disengaged from the cam portion 337b so as to continue the driving of the motor by the control circuit. When the actuator 338a again rides on the cam portion 337b upon rotation of the cam disc 337 in synchronism with the movement of the belts 13, the driving of the motor is stopped by the actuation of the switch 338 so as to stop the belts 13, thereby permitting the mount 18 to be accurately positioned in alignment with the aperture 6a at the end of each cycle of operation in either of the opposite two direction of the movement of the belts 13.

The groove 342b formed in the plate 342 serves to finely adjust the angular position of the plate 342 with respect to the cam disc 337 in cooperation with a jig hole 344 in the frame of the projector by rotating a key-shaped adjusting tool (not shown) the tip of which is inserted in the jig hole 344 while the wing of the key is engaged with the groove 342b. Similarly, the groove 345c of the plate 345 serves to finely adjust the position of the limiting edge 345b in cooperation with a jig hole 347 formed in the cam disc 337.

In order to insure the positive driving of the mount 18 by the belts 131, 132, the belts 131, 132 have preferably outer surfaces made of a material having a high coefficient of friction.

We claim:

1. A slide film projector device for transporting a plurality of conventional slide film mounts stored in a first magazine in superposed relationship to each successively therefrom to a film projection aperture and, thereafter, to a second magazine so as to store them in superposed relationship to each other wherein the improvement comprises endless belt means arranged to move across the open end of each magazine and having a stepped shoulder portion adapted to engage with the side edge of a mount for transporting the same by the movement of said belt means, driving roller means engaging with said endless belt means for driving the same, signal generating means for generating electric signals in coupled relationship to the movement of said driving roller means, and an electric logic control circuit receiving said signals for controlling the operation of said driving roller means in response to said signals, thereby permitting the slide film mounts to be successively fed from said first magazine to said film projection aperture and, thereafter, from said aperture to said second magazine, wherein the height of said stepped shoulder portion is smaller that the smallest thickness of said mounts so that only one mount at a time can be positively engaged by said shoulder portion, and wherein said projection aperture comprises a pressure plate and a projection gate between which said mount is sandwiched and which assure accurate positioning of said mount relative to a projection lens system; said pressure slate having a length sufficient to extend between said magazines to permit said slide mounts to be transmitted at an exact position with said mounts being engaged between said belt means and said pressure plate.

2. Device according to claim 1, wherein said belt means comprises at least a pair of spaced opposingly arranged stepped shoulder portions for permitting the mounts to be transported successively in the reverse direction by said belt means from said second magazine to said aperture and, thereafter, to said first magazine.

3. Device according to claim 2, further comprising prevention means arranged adjacent to the open end of each magazine for preventing two or more mounts from being moved out of the magazine simultaneously.

4. Device according to claim 3, wherein each said prevention means comprises a roller and a resilient supporting member for resiliently supporting said roller so as to urge the same whereby a resisting force is given to the upper one of the mounts which are being moved out of the magazine simultaneously.

5. Device according to claim 1, further comprising prevention means arranged adjacent to the open end of said first magazine for preventing two or more mounts from being moved out of said first magazine simultaneously.

6. Device according to claim 5, wherein said prevention means comprises a roller and a resilient supporting member for resiliently supporting said roller so as to urge the same whereby a resisting force is given to the upper one of the mounts which are being moved out of said first magazine simultaneously.

7. A slide film projector device for transporting a plurality of slide film mounts stored in a first magazine in superposed relationship to each other successively therefrom to a film projection aperture and, thereafter, to a second magazine so as to store there in superposed relationship to each other, wherein the improvement comprises endless belt means arranged to move across the open end of each magazine and having a stepped shoulder portion adapted to engage with the side edge of a mount for transporting the same by the movement of said belt means, driving roller means engaging with said endless belt means for driving the same, signal generating means for generating electric signals in coupled relationship to the movement of said driving roller means, and an electric logic control circuit receiving said signals for controlling the operation of said driving roller means in response to said signal thereby permitting the slide film mounts to be successively fed from said first magazine to said film projection aperture and, thereafter, from said aperture to said second magazine, wherein said signal generating means comprises a plurality of switch means and cam means driven in synchronism with the movement of said driving roller means for sequentially actuating said switch means thereby permitting said belt means to be moved in one direction so as to transport a mount engaging with said stepped shoulder portion of said belt means in alignment with said aperture and into said second magazine, thereafter, to be moved in reverse direction until said stepped shoulder portion moves beyond the opening of said first magazine, and then to be moved again in said one direction so as to transport a mount in said first magazine to the position in alignment with said aperture, and finally to stop the movement of said belt means so as to hold said mount in alignment with said aperture.

8. A slide film projector device for transporting a plurality of slide film mounts stored in a first magazine in superposed relationship to each other successively therefrom to a film projection aperture and, thereafter, to a second magazine so as to store there in superposed relationship to each other, wherein the improvement comprises endless belt means arranged to move across the open end of each magazine and having a stepped shoulder portion adapted to engage with the side edge of a mount for transporting the same by the movement of said belt means, driving roller means engaging with said endless belt means for driving the same, signal generating means for generating electric signals in coupled relationship to the movement of said driving roller means, and an electric logic control circuit receiving said signals for controlling the operation of said driving roller means in response to said signal thereby permitting the slide film mounts to be successively fed from said first magazine to said film projection aperture and, thereafter, from said aperture to said second magazine, wherein said belt means comprises at least a pair of spaced opposingly arranged stepped shoulder portions for permitting the mounts to be transported successively in the reverse direction by said belt means from said second magazine to said aperture and, thereafter, to said first magazine, and wherein said signal generating means comprises at least one switch means and cam means driven in synchronism with the movement of said belt means for actuating said switch means thereby permitting said belt means to be moved in either one of the two opposite directions so as to transport a mount engaging with said stepped shoulder portion of said belt means in alignment with said aperture and into either of said magazines, thereafter, upon further movement of said belt means in said either one of the two opposite directions until said stepped shoulder portion reaches the open end of the other magazine, to transport a mount in said other magazine to the position in alignment with said aperture, and finally to stop the movement of said belt means so as to hold said mount in alignment with said aperture.

9. Device according to claim 8, wherein the distance between the opposing shoulder portions of said pair is made greater than the width of said mount, further comprising idle movement means for moving said belt means by a distance equal to the spacing of said opposing shoulder portions minus the width of the magazine while said cam means is held stationary when said belt means is moved in the reverse direction.

10. Device according to claim 9, wherein said idle movement means comprises relatively slidable pin-elongated groove means coupling said cam means with driving means thereof.

11. Device according to claim 9, further comprising a switch mounting plate for securing said switch means and rotatable about the axis of said cam means, securing means for securing said plate in the adjusted angular position with respect to said cam means and, limiting means for adjustingly limiting the range of idle movement effected by said idle movement means.

12. Device according to claim 11, wherein said limiting means comprises relatively slidable pin-elongated groove means coupling said cam means with driving means thereof, and means for adjustingly limiting the length of the elongated groove.

13. Device according to claim 8, comprising a pair of oppositely oriented unidirectionally actuatable switches cooperating with said cam means, one for the one direction of movement of said belt means while the other is for the opposite direction of movement of said belt means.

14. A slide film projector device for transporting a plurality of slide film mounts stored in a first magazine in superposed relationship to each other successively therefrom to a film projection aperture and, thereafter, to a second magazine so as to store there in superposed relationship to each other, wherein the improvement comprises endless belt means arranged to move across the open end of each magazine and having a stepped shoulder portion adapted to engage with the side edge of a mount for transporting the same by the movement of said belt means, driving roller means engaging with said endless belt means for driving the same, signal generating means for generating electric signals in coupled relationship to the movement of said driving roller means, and an electric logic control circuit receiving said signals for controlling the operation of said driving roller means in response to said signal thereby permitting the slide film mounts to be successively fed from said first magazine to said film projection aperture and, thereafter, from said aperture to said second magazine, and rotating mount push-in friction means adapted to move into the interior of said second magazine through the open end thereof in timed relationship to the movement of said belt means so as to urge the mounts already received in said second magazine inwardly thereof so that a mount which is being transported into said second magazine will not be subjected to interference by the mounts already received in said second magazine.

15. Device according to claim 14, wherein said rotating mount push-in friction means comprises an endless belt having a high coefficient of friction, a pair of rollers stretching said endless belt therearound and rotated in synchronism with the movement of said belt means at a peripheral velocity higher than the velocity of said belt means, one of which rollers is supported by swingable lever means so as to be moved into the interior of said second magazine thereby permitting the incoming mount to be moved faster than said belt means when said incoming mount engages with said endless belt so as to positively disengage said incoming mount from said belt means.

16. Device according to claim 14, wherein said belt means is provided with a raised portion at the raised side of said shoulder portion adjacent thereto thereby permitting the mount next to the frontmost mount in said one magazine to be urged inwardly thereof by said raised portion when the frontmost mount is being moved out of the magazine so that seizure of the moving mount to the fins and the deformed portions formed in the edge of the opening in the mount next to said frontmost mount will be positively prevented.

17. Device according to claim 14, further comprising mount push-in roller means adapted to be moved inwardly of the interior of said second magazine at the upper side of the open end thereof in timed relationship to the movement of said rotating mount push-in friction means, and resilient plate means resiliently urging the mounts already received in said second magazine toward the open end thereof thereby permitting the mounts already received in said second magazine to be inclined by said roller means with respect to the plane of said belt means supporting the incoming mount so that seizure of the incoming mount by the fins and the deformed portions formed in the edge of the opening in the mount adjacent to said incoming mount will be positively prevented.

18. A slide film projector device for transporting a plurality of slide film mounts stored in a first magazine in superposed relationship to each other successively therefrom to a film projection aperture and, thereafter, to a second magazine so as to store there in superposed relationship to each other, wherein the improvement comprises endless belt means arranged to move across the open end of each magazine and having a stepped shoulder portion adapted to engage with the side edge of a mount for transporting the same by the movement of said belt means, driving roller means engaging with said endless belt means for driving the same, signal generating means for generating electric signals in coupled relationship to the movement of said driving roller means, and an electric logic control circuit receiving said signals for controlling the operation of said driving roller means in response to said signals thereby permitting the slide film mounts to be successively fed from said first magazine to said film projection aperture and, thereafter, from said aperture to said second magazine, wherein said belt means comprises at least a pair of spaced opposingly arranged stepped shoulder portions for permitting the mounts to be transported successively in the reverse direction by said belt means from said second magazine to said aperture and, thereafter, to said first magazine, and a pair of rotating mount push-in friction means each adapted to move into the interior of the respective magazine through the open end thereof in timed relationship to the movement of said belt means depending upon the direction of movement of said belt means so as to urge the mounts already received in either one of said magazines inwardly thereof so that a mount which is being transported into the magazine will not be subjected to interference by the mounts already received in the magazine.

19. Device according to claim 18, wherein each of said rotating mount push-in friction means comprises an endless belt having a high coefficient of friction, a pair of rollers stretching said endless belt therearound and rotated in synchronism with the movement of said belt means at a peripheral velocity higher than the velocity of said belt means, one of which rollers is supported by swingable lever means so as to be moved into the interior of the magazine thereby permitting the incoming mount to be moved faster than said belt means when said incoming mount engages with said endless belt so as to positively disengage said incoming mount from said belt means.

20. Device according to claim 18, wherein said belt means is provided with a raised portion at the raised side of each said opposing shoulder portions of said pair adjacent thereto thereby permitting the mount next to the frontmost mount in either of the magazine to be urged inwardly thereof by said raised portion when the frontmost mount is being moved out of the magazine so that seizure of the moving mount to the fins and deformed portions formed in the edge of the opening in the mount next to said frontmost mount will be positively prevented.

21. Device according to claim 18, further comprising a pair of mount push-in roller means each adapted to be moved inwardly of the interior of the respective magazine at the upper side of the open end thereof in timed relationship to the movement of said rotating mount push-in friction means of the respective magazine, and resilient plate means resiliently urging the mounts already received in the respective magazine toward the open end thereof thereby permitting the mounts already received in either of the magazines to be inclined by said roller means with respect to the plane of said belt means supporting the incoming mount so that seizure of the incoming mount by the fins and the deformed portions formed in the edge of the opening in the mount adjacent to said incoming mount will be positively prevented.

* * * * *